United States Patent [19]
Broadhead et al.

[11] 3,791,867
[45] Feb. 12, 1974

[54] RECHARGABLE NONAQUEOUS BATTERY

[75] Inventors: John Broadhead, Morristown; Alexander Duane Butherus, Murray Hill, both of N.J.

[73] Assignee: Bell Telephone Laboratories, Incorporated, Murray Hill, N.J.

[22] Filed: July 24, 1972

[21] Appl. No.: 274,596

[52] U.S. Cl. .................................. 136/6 R, 136/20
[51] Int. Cl. ............................................ Holm 35/02
[58] Field of Search ..................... 136/6, 83, 100, 20

[56] References Cited
UNITED STATES PATENTS 3,639,174  2/1972  Kegelman ....................... 136/6 LN
3,043,896  7/1962  Herbert et al. .................. 136/6 LN
3,248,265  4/1966  Herbert ........................... 136/6 LN
3,532,548  10/1970 Nole et al. ....................... 136/6 LN
3,730,771  5/1973  Tannenberger et al. ................ 136/6

Primary Examiner—A. B. Curtis
Assistant Examiner—C. F. Lefevour
Attorney, Agent, or Firm—W. L. Keefauver et al.

[57] ABSTRACT

A nonaqueous battery is described which employs a conventional nagative electrode and a positive electrode in which the active material is incorporated in the layered structure of a transition metal chalcogenide. Such positive electrode structures may be utilized completely and are rechargeable.

10 Claims, 3 Drawing Figures

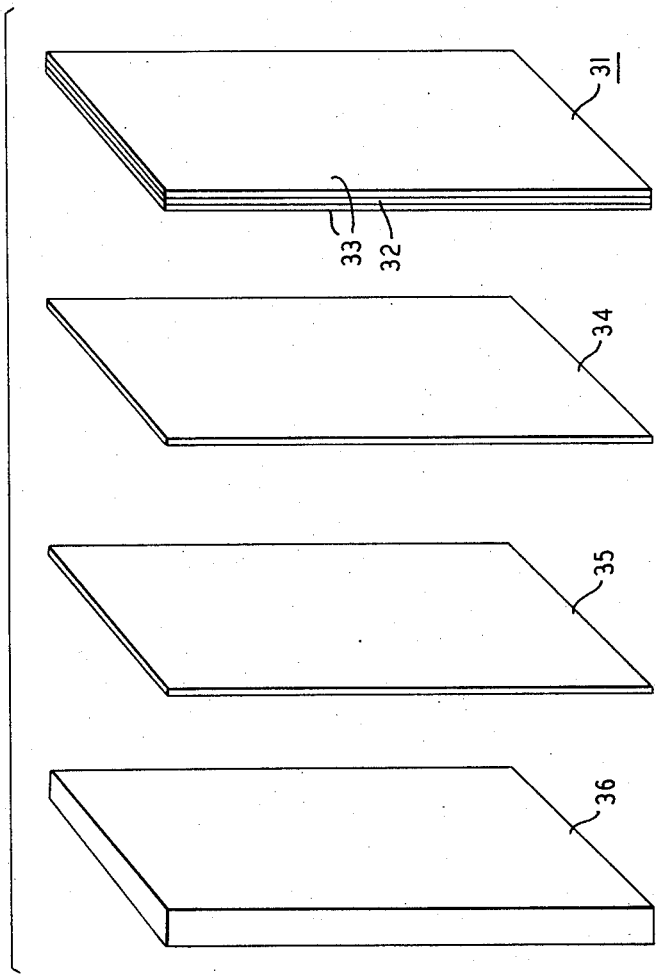
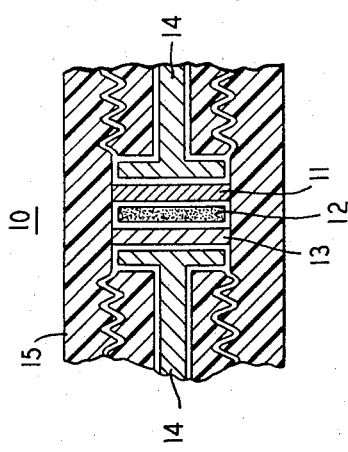

RECHARGABLE NONAQUEOUS BATTERY

BACKGROUND OF THE INVENTION

1. Field of the Invention

The invention relates to nonaqueous batteries, and in particular, to nonaqueous batteries with positive electrodes which have novel compositions.

2. Description of the Prior Art

There has been considerable interest in recent years in nonaqueous batteries. An attractive feature of these batteries is their potentially high voltage which results largely from the fact that absent water hydrogen is not liberated by electrolytic reduction. Also, because of the high voltages, these batteries have potentially large capacities per unit size. Particularly attractive are nonaqueous batteries using lithium negative electrodes since the lithium equilibrium potential is quite high and its density is quite low so that such electrodes have exceptionally high power capacities per unit weight (see for example, High-Energy Batteries by R. Jasinski, Plenum Press, New York, 1967, p. 141).

Problems which have limited the usefulness of nonaqueous batteries are associated with the structure and composition of the positive electrode. Ordinarily the active material in the positive electrode has been a metal salt such as copper fluoride where that active species is the copper cation. Such positive electrodes have two disadvantages, one associated with the extremely low conductivity of the salts, and the other associated with the fact that these salts are not completely insoluble in electrolyte solvents usually used in nonaqueous batteries such as propylene carbonate (see above reference p. 150). The extremely low conductivity of these salts limits the utilizable capacity (fraction of theoretical capacity that can be obtained in a reasonable time) and rate of discharge of the batteries because there is no conductive path to the active material in the positive electrode. The solubility of these salts causes some self discharge which limits the shelf life of the battery. More significant, this solubility leads in some systems to dendritic growth which eventually shorts the negative electrode to the positive electrode. The addition of conductive material to the active material in the positive electrode increases the conductivity to some extent, but does not solve the problems associated with the solubility of the salts in the electrolyte solvent.

In order to avoid these problems certain materials which do not yield metals on discharge have been used as the active material in the positive electrode. Particularly useful are the liquid and solid halogens (bromine and iodine) and solid chalcogen (sulfur, selenium and tellurium). Since these substances do not yield metals on discharge, the problems associated with dendritic growth and resulting shortout are considerably reduced. However, these materials are nonconductive and capacity and rate of discharge are quite limited. Graphite has been used to increase conductivity. Although the addition of graphite increases conductivity, such electrodes have limited life because of sludging or disintegration of the graphite electrode. (See for example, J. S. Dunning, W. H. Tiedmann, L. Hsueh and D. N. Bennion, J. Electrochem. Soc. 118, p. 1886 (1971).

SUMMARY OF THE INVENTION

The invention is a nonaqueous battery in which the positive electrode contains as the active material a halogen or chalcogen which is incorporated in a host material with a layered structure. This host material is a transition metal chalcogenide. Examples of such host materials are $TaTe_2$, $TaS_2$, $WS_2$, $WSe_2$, $WTe_2$, $MoSe_2$, $MoTe_2$, $NbS_2$, $NbSe_2$, $NbTe_2$, $TiS_2$, $TiTe_2$. Active positive electrodes materials are limited to the solid and liquid halogens such as iodine and bromine, and the solid chalcogens such as sulfur, selenium and tellurium. Incorporation of these active materials in layered host materials prevents solution of the active material in electrolyte solvents thus reducing or eliminating self-discharge of the battery and dendritic growth. Thus these nonaqueous batteries can be recycled many times and are suitable for secondary sources of power. Further, these layered host materials are conductive and are in intimate contact, presumably on a molecular basis, with the active materials in the positive electrode so that they can be essentially completely discharged. This results in high capacity for the positive electrode. These positive electrodes are also used with solid electrolyte such as $RbAg_4I_5$ and magnesium ion conductors such as $Ba_xMg_{6-x}Se_6$ and similar systems. Batteries using these positive electrodes and solid electrolytes also exhibit high utilizable capacity.

BRIEF DESCRIPTION OF THE DRAWING

FIG. 1 shows a side view of a battery employing a conventional negative electrode and a positive electrode containing iodine as the active substance and niobium diselenide as the layered host material;

FIG. 3 shows the components of a thin film cell made in accordance with the invention.

DETAILED DESCRIPTION

1. Preparation of the Cell

Figure 2:
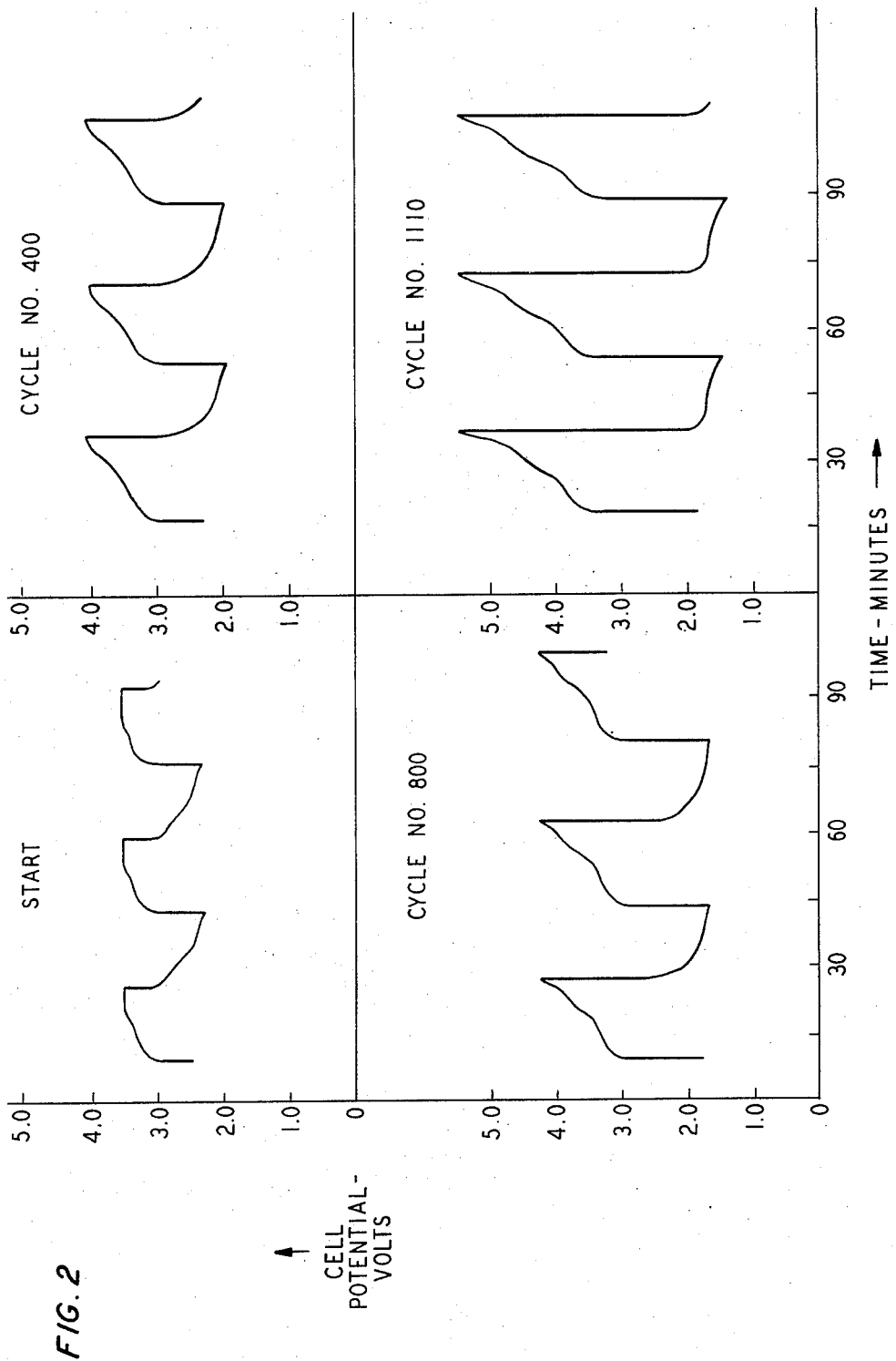
FIG. 2 is a graph which presents data on cell voltage vs. time of charge and discharge, first on a new cell, then on a cell which has been recycled various numbers of times up to 1100.

The positive electrode of the cell can be made in a variety of ways. For example, pressed pellets can be made by mixing together the transition metal chalcogenide and the active nonmetallic halogens or chalcogens and pressing in a vacuum pellet press. These operations must be carried out in the absence of moisture, as for example, in a dry box since water reacts with the chalcogenides. Also, air must be excluded when highly reactive substances, such as lithium, are used in the cell.

Particularly attractive is a thin film battery in which the positive electrode is made by taking a sheet of transition metal, such as, for example, niobium, and reacting it with a chalcogen such as selenium to form a thin film of the positive electrode. The active substance in the positive electrode is then brought mechanically or electrochemically into contact with this thin film of transition metal chalcogenide ($NbSe_2$). (See the Dunning et al reference cited above and references cited therein.)

The negative electrode is conventional. For example, the metallic active substance may be pressed into the form of a pellet or in the case of a thin film battery, may be rolled in a thin sheet. Lithium metal is attractive as the active ingredient in the negative electrode because of high cell voltage and low density which leads to high capacity per unit weight. Magnesium is also attractive, it also has high capacity per unit weight (though not as high as lithium) and is not as reactive so that more conventional components can be used in the battery.

A variety of electrolytes can be used. One such electrolyte is a salt in which the cation is the ionic counterpart of the active ingredient in the negative electrode, and the anion corresponds to the active ingredient in the positive electrode. The electrolyte is then dissolved in a suitable solvent such as propylene carbonate. Other suitable solvents are dimethyl formamide, butyrolactone, ethylene carbonate, dimethyl sulfite, and acetonitrile. A supporting electrolyte might be added to increase conductivity. Solid electrolytes such as $RbAg_4I_5$ or magnesium ion conductor electrolytes such as $Ba_xMg_{6-x}S_6$ and $Ba_xMg_{6-x}Se_6$ where $x$ ranges from 0.8 to 1.2 are also used as electrolytes.

In the thin film version of the battery it is often convenient to assemble the components in a discharged state. The cell is assembled without active ingredients in the positive and negative electrodes (or where excess capacity is to be incorporated in one electrode, this electrode would contain some active ingredient). However, the cell would contain excess electrolyte composed of the cation of the active ingredient in the negative electrode and the anion of the active ingredient in the positive electrode. After assembly of the cell it is charged, which results in electrolytic production of the active ingredient in both electrodes. In the positive electrode, this results in halogen or chalcogen intercalating into the layered structure of the transition metal chalcogenide.

2. Characteristics of Cells

The results of tests carried out on several cells using pressed pellets show that a large variety of transition metal chalcogenides with layered structures can be used as host materials for solid and liquid halogens and chalcogens in positive electrodes. These include $TaTe_2$, $TaS_2$, $WS_2$, $WSe_2$, $WTe_2$, $MoSe_2$, $MoTe_2$, $NbS_2$, $NbSe_2$, $NbTe_2$, $TiS_2$, and $TiTe_2$. Typical results are obtained using niobium diselenide as the host material and iodine as the active material in the positive electrode. The structure of a typical cell is shown in FIG. 1. Using a lithium negative electrode and 18-minute charge/18-minute discharge cycles at 1 mA cm$^{-2}$ cycled in excess of 1,100 times to 1.5 volts this cell shows utilization of active material in the positive electrode of approximately 4 percent of theoretical capacity. At half this current capacity a similar cell cycles over 7,000 times before increased resistance limits the discharge voltage. With a 45-minute charge/45-minute discharge cycled at 1 mA cm$^{-2}$ a similar cell exhibits 11 percent of theoretical capacity and has a life in excess of 300 cycles. This utilization compares favorably with the utilization found in lead-acid batteries.

3. The Figures

FIG. 1 shows a side view of a cell structure 10 with a negative electrode 11, a separator 12 impregnated with an electrolyte and a positive electrode 13 containing both the compound with the layered structure together with the active ingredient with halogen or chalcogen. Also shown are the current collectors 14 on both sides of the structure and the surrounding structure 15 usually made of an inert nonconducting material.

FIG. 2 shows in a series of graphs the cycle voltages of cells made in accordance with the invention at various stages in the life of the cell. This particular cell uses a lithium negative electrode and a positive electrode in which iodine is intercalated in niobium diselenide. The cell is subjected to 18-minute charge/18-minute discharge cycles at 1 mA cm$^{-2}$. As can be seen, the cell exhibits some capacity even after 1,100 cycles.

FIG. 3 shows the cell components of a thin film battery including a positive electrode 31 composed of niobium metal 32 and thin films of niobium diselenide layered structure 33. Also shown is the negative electrode 35 and separator 34. The thin film battery which would usually be rolled in the form of a cylinder would usually have an outer hard material or can material 36. The capacity of the battery can be increased by increasing the area of the thin films in each cell.

What is claimed is:

1. A nonaqueous battery comprising a negative electrode, an electrolyte, and a positive electrode consisting essentially of an active material selected from the group consisting of iodine, bromine, sulfur, selenium and tellurium, characterized in that the active material in the positive electrode is present as an intercalated species in a layered structure in which at least one layer consists essentially of a transition metal chalcogenide.

2. The battery of claim 1 in which the transition metal chalcogenide is selected from the group consisting of $TaTe_2$, $TaS_2$, $WS_2$, $WSe_2$, $WTe_2$, $MoSe_2$, $MoTe_2$, $NbS_2$, $NbSe_2$, $NbTe_2$, $TiS_2$, and $TiTe_2$.

3. The battery of claim 1 in which the active material in the positive electrode is iodine.

4. The battery of claim 1 in which the active material in the positive electrode is sulfur.

5. The battery of claim 1 in which the transition metal chalcogenide is niobium selenide.

6. The battery of claim 1 in which the electrolyte is lithium iodide dissolved in propylene carbonate.

7. The battery of claim 1 in which the electrolyte is lithium sulfide dissolved in propylene carbonate.

8. The battery of claim 1 in which the active material in the negative electrode is lithium metal.

9. The battery of claim 1 in which the active material in the negative electrode is magnesium.

10. The battery of claim 1 in which the electrolyte is a solid.

* * * * *